(12) United States Patent
Kosterev (10) Patent No.: US 9,746,375 B2
(45) Date of Patent: Aug. 29, 2017

(54) SYSTEMS, METHODS, AND APPARATUS FOR OPTICAL NOISE MANAGEMENT IN OPTICAL SPECTROSCOPY

(71) Applicant: Yokogawa Electric Corporation, Tokyo (JP)

(72) Inventor: Anatoliy A. Kosterev, Pearland, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 80 days.

(21) Appl. No.: 14/247,526

(22) Filed: Apr. 8, 2014

(65) Prior Publication Data

US 2015/0285680 A1    Oct. 8, 2015

(51) Int. Cl.
| | | |
|---|---|---|
| *G01J 3/02* | (2006.01) | |
| *G02F 1/19* | (2006.01) | |
| *G02F 1/01* | (2006.01) | |
| *G02F 1/21* | (2006.01) | |

(Continued)

(52) U.S. Cl.
CPC ............... *G01J 3/0297* (2013.01); *G01J 3/42* (2013.01); *G01J 3/433* (2013.01); *G02F 1/0131* (2013.01); *G02F 1/0147* (2013.01); *G02F 1/19* (2013.01); *G02F 1/21* (2013.01)

(58) Field of Classification Search
CPC ......... G01J 3/0286; G01J 3/0294; G02F 1/21; G02F 1/0147; G02F 1/19; G02F 1/0131
See application file for complete search history.

(56) References Cited

U.S. PATENT DOCUMENTS

| | | | |
|---|---|---|---|
| 513,941 A | 1/1894 | King | |
| 813,109 A | 2/1906 | Norling | |
| 1,817,213 A * | 8/1931 | Smith | .......................... 200/82 R |

(Continued)

FOREIGN PATENT DOCUMENTS

| | | |
|---|---|---|
| DE | 102012004845 A1 | 9/2013 |
| EP | 2458211 A1 | 5/2012 |

(Continued)

OTHER PUBLICATIONS

Oxford Dictionaries, modulate, Feb. 12, 2016.*

(Continued)

*Primary Examiner* — Kara E Geisel
*Assistant Examiner* — Dominic J Bologna
(74) *Attorney, Agent, or Firm* — Eversheds Sutherland (US) LLP (57) ABSTRACT

Aspects of the disclosure include suppression of optical interference fringes in optical spectra via a modification to the refractive index of media that forms or is contained in one or more components of equipment utilized for optical spectroscopy. Such a modification can yield changes in the optical path of light propagating through at least one of the media, with the ensuing changes in the spectral structure of interference between light propagating through different optical paths. In certain embodiments, the refractive index of the media that forms or is contained in one or more components can be modified via application of a time-dependent stimulus to at least one of the one or more components. The applied stimulus can include pressure, mechanical strain or stress, temperature, a combination thereof, or the like.

4 Claims, 4 Drawing Sheets

(51) Int. Cl.
*G01J 3/42* (2006.01)
*G01J 3/433* (2006.01)

(56) References Cited

U.S. PATENT DOCUMENTS

| | | | |
|---|---|---|---|
| 2,554,931 | A | 5/1951 | Welden |
| 2,609,835 | A | 9/1952 | Horvay |
| 4,900,104 | A | 2/1990 | Clifford |
| 5,801,831 | A | 9/1998 | Sargoytchev |
| 7,800,764 | B2 * | 9/2010 | Kluczynski ............... G01J 3/02 356/519 |
| 2001/0050345 | A1 | 12/2001 | Im et al. |
| 2002/0048294 | A1 * | 4/2002 | Newman et al. ............... 372/32 |
| 2003/0058539 | A1 * | 3/2003 | Chen ................... G02B 6/29395 359/578 |
| 2003/0090806 | A1 * | 5/2003 | Chen ............................ 359/634 |
| 2011/0228371 | A1 * | 9/2011 | Kluczynski et al. ...... 359/221.2 |

FOREIGN PATENT DOCUMENTS

| | | |
|---|---|---|
| GB | 2347732 A | 9/2000 |
| JP | 3-156346 A | 7/1991 |

OTHER PUBLICATIONS

Dictionary.com, modulating, Feb. 12, 2016.*
Reid, et al., "Sensitivity limits of a tunable diode laser spectrometer, with application to the detection of NO2 at the 100-ppt level," Appl. Opt. 19, 3349-3354 (1980).*
Fried et al., "Reduction of Interference Fringes in Small Multipass Absorption Cells by Pressure Modulation", Applied Optics, vol. 29, No. 7, Mar. 1, 1990, pp. 900-902, XP000101345.
Extended European Search Report for Application No. 15161904.6-1754 dated Aug. 11, 2015, pp. 1-7.
Extrended European Search Report for Application No. 15161836.0-1554 dated Aug. 25, 2015, pp. 1-8.

* cited by examiner

SYSTEMS, METHODS, AND APPARATUS FOR OPTICAL NOISE MANAGEMENT IN OPTICAL SPECTROSCOPY

CROSS-REFERENCE TO RELATED APPLICATION

This application relates to U.S. patent application Ser. No. 14/247,682, entitled "APPARATUS AND METHODS FOR PASSIVE PRESSURE MODULATION," filed on Apr. 8, 2014, the entirety of which is incorporated herein by reference.

TECHNICAL FIELD

Aspects of the disclosure relate generally to optical spectroscopy and more specifically to noise management in optical spectroscopy.

BACKGROUND

Certain branches of analytical spectroscopy can rely on optical spectroscopy to observe and study the chemistry of fluids (e.g., presence of $CO_2$, $H_2O$, or other compounds) and/or the dynamics of chemical reactions (such as oxidation and/or combustion). In general, optical noise arising from optical interference between different pathways for light propagation within the equipment utilized for the optical spectroscopy is often the primary sensitivity-limiting factor in such spectroscopy. Conventional solutions to suppress the optical noise are typically prohibitively expensive, cumbersome to implement, and/or limited to current generation equipment, without a backwards compatible implementation.

BRIEF DESCRIPTION OF THE DRAWINGS

The accompanying drawings are an integral part of the disclosure and are incorporated into the present specification. The drawings illustrate examples of embodiments of the disclosure and, in conjunction with the description and claims, serve to explain, at least in part, various principles, features, or aspects of the disclosure. Certain embodiments of the disclosure are described more fully below with reference to the accompanying drawings. However, various aspects of the disclosure can be implemented in many different forms and should not be construed as being limited to the implementations set forth herein Like numbers refer to like, but not necessarily the same or identical, elements throughout.

DETAILED DESCRIPTION

The disclosure recognizes and addresses, in at least certain aspects, the issue of optical noise in analytical spectroscopy. The disclosure provides devices, systems, and/or techniques for management (e.g., reduction and/or control) of optical noise in optical spectroscopy. As described in greater detail below, in at least certain aspects, the disclosure permits suppression of optical interference fringes in optical spectra via a modification to the refractive index of media that forms or is contained in one or more components of equipment utilized for optical spectroscopy. Such a modification can yield changes in the optical path of light propagating through at least one of the media, with the ensuing changes in the spectroscopy structure of interference between light propagating through different optical paths. The media can include transparent or semi-transparent materials (either solids, fluids (such as, liquid, gas, or a combination thereof), or combinations thereof). In certain embodiments, the refractive index of the media that forms or is contained in one or more components can be modified via application of a time-dependent stimulus (periodic or otherwise) to at least one of the one or more components. The applied stimulus can include pressure, mechanical strain or stress, temperature, a combination thereof, or the like. In addition, at least in certain embodiments, application of the stimulus can be implemented via passive control components, such as pneumatic components without active control.

Various aspects of the disclosure are illustrated in connection with optical spectroscopy equipment and modulation of refractive index of a gas therein via modulation of the pressure of the gas. Yet, it should be appreciated that the disclosure is not so restricted and permits management of optical noise in such equipment via modulation of the refractive index of gas contained in the equipment and/or optical elements therein via application of a time-dependent stimulus (e.g., time-dependent pressure, strain, and/or temperature). The principles of the disclosure generally can be applied to substantially any enclosure containing a gas and/or optical element(s) that are part of optical spectroscopy equipment.

Figure 1:
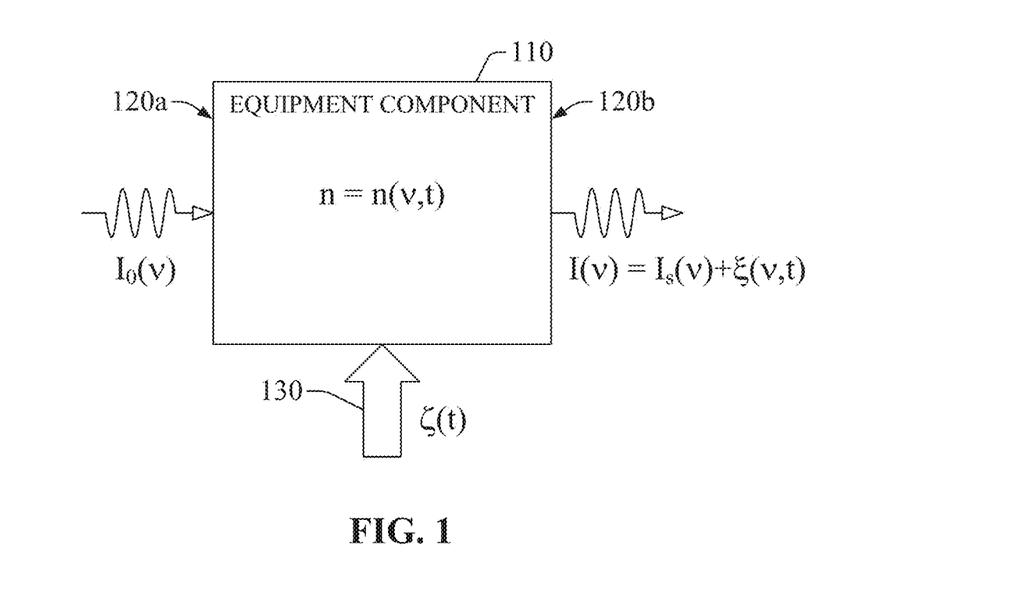
FIG. 1 presents an example of an equipment component in accordance with one or more aspects of the disclosure.
Figure 5:
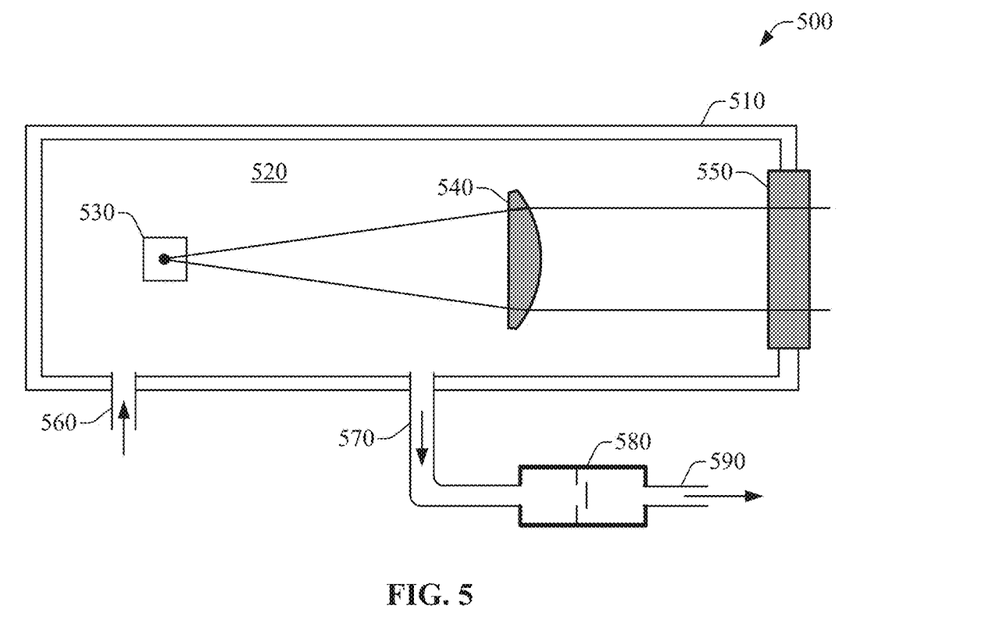

One example advantage may include simplicity of implementation and cost efficiency. With reference to the drawings, FIG. 1 presents an example of an equipment component 110 in accordance with at least certain aspects of the disclosure. In certain embodiments, the equipment component 110 can be embodied in or can include an enclosure of an optical spectroscopy analyzer. Such an enclosure can include one or more compartments, where at least one of the one or more compartments can be substantially hermetic or otherwise sealed. In other embodiments, the equipment component 110 can be embodied in or can comprise an optical element (e.g., a lens, a window, or the like) of the optical spectroscopy analyzer. In yet other embodiments, the equipment component 110 can be embodied in or can include a combination of an enclosure and a group of optical members of the optical spectroscopy analyzer. In addition, the equipment component 110 can contain a solid, a fluid (such as a liquid or gas) or a mixture thereof, and can include a first surface 120a and a second surface 120b and a space (e.g., separation) between the first surface 120a and the second surface 120b. As an illustration, the equipment component 110 can be a compartment of the optical spectroscopy equipment, such as a tunable diode laser spectroscopy (TDLS) analyzer, and can contain the gas, the fluid (such as a gas or liquid) or the mixture thereof that can be probed via such equipment. In the alternative, the equipment component 110 can be an optical element (which also may be referred to as an optical member) of the optical spectroscopy equipment. For example, as described herein, the optical element can be a lens (e.g., a meniscus, an aspheric lens, or the like), or a transparent or semi-transparent window. Such a lens or window can be solid or can include a mixture of a solid and a fluid. Further, the equipment component 110 can include a combination of one or more compartments and/or one or more optical members. More specifically, yet not exclusively, the equipment component 110 can include a compartment having a light source of the optical spectroscopy equipment (e.g., a gas-discharge lamp or a laser), a collimating lens, and a propagation window (as best shown in FIG. 5 discussed herein), where the compartment contains a fluid (such as a gas, liquid, or some combination thereof).

The equipment component 110 can be configured (e.g., assembled or mounted) to receive light having a frequency (v) and intensity ($I_0$), and can permit propagation of the received light. The received light can be utilized or otherwise leveraged to probe a material (e.g., a solid, a gas, a liquid, or a mixture thereof) via the optical spectroscopy equipment that includes the equipment component 110. As described herein, in certain embodiments, such a material can be contained within the equipment component 110. While the intensity $I_0$ can depend on the frequency v (or wavelength), in certain embodiments, such a dependency can be weak, yielding an approximately constant intensity over a range of frequencies. The light that is received can be substantially monochromatic (visible or otherwise) or can be composed of multiple frequencies within the visible or non-visible range of the electromagnetic spectrum. As illustrated, the light can be received at the surface 120a and can propagate trough the equipment component 110, exiting through the surface 120b. It can be readily apparent that the surfaces 120a and 120b can be embodied in or can include a transparent or semi-transparent material.

The light that propagates through the equipment component 110 can have an intensity I(v) that can depend on frequency. Without intending to be bound or otherwise limited by theory and/or modeling, in one aspect, such dependency can be attributed to a signal $I_s(v)$ substantially originated in the optical absorption spectrum of a material contained in or that forms the equipment component 110, and optical noise $\xi(v)$ substantially originated from optical interference between light that propagates from the first surface 120a to the second surface 120b through different optical paths. The optical interference may be referred to as "etalon effect" and generally yields fringes of optical interference associated with alternating maxima and minima of intensity, or strength, of the optical noise $\xi(v)$. The optical interference fringes may be referred to as "etalons," and such maxima and minima can arise from constructive interference and destructive interference between light that propagates through different optical paths between surfaces 120a and 120b.

Figure 2:
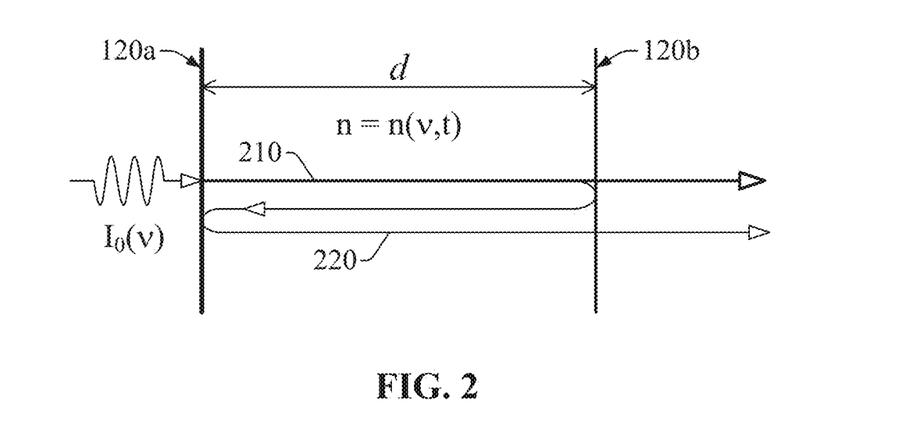
FIG. 2 illustrates optical paths of light propagating within an equipment component in accordance with at least certain aspects of the disclosure.

Without intending to be bound or otherwise limited by geometric optics theory, FIG. 2 illustrates two optical paths between surfaces 120a and 120b: a first optical path 210 in which light propagates directly from the first surface 120a to the second surface 120b; and a second optical path 220 in which light propagates from the first surface 120a to the second surface 120b, reflects off the second surface 120b and propagates to the first surface 120a, and reflects off the first surface 120a and propagates back to the second surface 120b. The first optical path 210 and second optical path 120 are represented with lines of different thickness, and have optical distances d·n and 2d·n, respectively, where d represents the distance between the first surface 120a and the second surface 120b, and n represents the refractive index of the medium (e.g., a solid, a fluid, or a combination thereof) contained within such surfaces. As illustrated, in one aspect, the refractive index can depend on frequency of light (v) and time (t): n=n(v, t). The optical distance d·n can determine the period of the spacing between optical interference fringes, where maxima (e.g., constructive interference) occurs when the following condition is satisfied: 2d·n=mλ, where m is a natural number and λ=c/v is the vacuum wavelength of the light, and where c is the speed of light in vacuum. Accordingly, a change in optical distance matching a quarter wavelength can cause a transition from constructive interference to destructive interference. Put simply, when the condition Δ(d·n)=λ/4 is satisfied, the strength of optical noise can transition from a maximum to a minimum. Accordingly, in one aspect, control of changes in the optical distance via modification of the refractive index of a medium that composes the equipment component 110 can permit management of the optical noise in optical spectroscopy.

Figure 3:
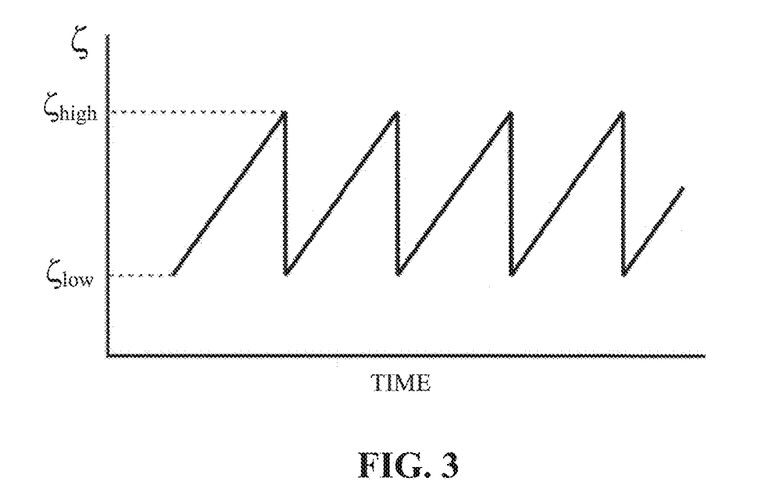
FIG. 3 presents an example of a time dependent stimulus for management of optical noise in optical spectroscopy in accordance with at least certain aspects of the disclosure.

It can be readily appreciated that, in one aspect, while the signal $I_s(v)$ can permit analyzing or otherwise probing a material contained in or that forms the equipment component 110, the optical noise $\xi(v)$ typically distorts the observed intensity I(v), and thus, the optical noise can mar the analysis. Such analysis can include chemical analysis based at least in part on the spectroscopic features of I(v). Accordingly, at least to mitigate the optical noise, the equipment component 110 can be submitted to a time-dependent stimulus ζ(t) that can modify the refractive index of the material contained in or that forms the equipment component 110. The stimulus can include pressure, mechanical strain or stress, temperature, a combination thereof, or the like. In one aspect, time-dependent modification of the refractive index of a material can occur in time scale greater than the time scale associated with modification of the refractive index via application of pressure. As illustrated in FIG. 1, in response to application of the stimulus ζ(t) (which is pictorially represented with an arrow), such a refractive index can depend on light frequency (or wavelength) and time, which can cause an optical path of light propagating within the equipment component 110 to be time-dependent as well. In such a scenario, n=n(v, t) (where as described herein, n represents the refractive index of a medium contained in or that forms the equipment component 110, v represents the frequency of light that propagates within the equipment component 110, and t represents time) and the optical path can be expressed as $\mathcal{L}$·n(v, t), where $\mathcal{L}$ is a geometric distance between two surfaces within the equipment component 110 (e.g., $\mathcal{L}$ can be the distance between the first surface 120a and the second surface 120b). A time-dependent optical path can yield a time-dependent optical noise $\xi(v, t)$ (where $\xi$ represents time-dependent optical noise), and the intensity of light that is transmitted through the surface 120b can be expressed as $I(v)=I_s(v)+\xi(v,t)$ (where I represents the intensity of light transmitted through the surface 120b, $I_s$ represents the intensity of the signal originated in the optical absorption spectrum of a material contained in or that forms the equipment component 110, and v represents frequency of light). For a stimulus ζ(v, t) (where ζ represents the magnitude of the stimulus, v represents frequency of light, and t represents time) having strength (or magnitude) that varies between a first value (e.g., a lower bound) and a second value (e.g., an upper bound), measurement of I(v) over a time scale that is longer that the time scale in which the stimulus changes from the first value to the second value can mitigate the optical noise present in the observed I(v). More specifically, yet not exclusively, for a stimulus that periodically varies from $\zeta_{low}$ to $\zeta_{high}$, measurement of I(v) over an interval greater than the period of the change between $\zeta_{low}$ to $\zeta_{high}$ can mitigate the presence of optical noise in the observed I(v). Such an interval may be referred to as the integration time of the measurement of I(v). More specifically, yet not exclusively, a suitable integration period can permit averaging multiple scans (or measurements) of I(v) and thus suppressing the contribution of the time-dependent optical noise $\xi(v, t)$ over time. Such suppression represents, in one aspect, a form of management of the optical noise. In addition, without intending to be bound or otherwise limited by theory and/or modeling, such a suppression of the time-dependent optical noise can originate from different strengths of the optical noise at a frequency v over time—e.g., the optical noise at the frequency v can transition between high strength (e.g., constructive interference maximum) and low strength (e.g., destructive interference minimum) over time. As illustrated in FIG. 3, in certain implementations, the stimulus $\zeta(t)$ 130 (where $\zeta$ represents stimulus and t represents time) can vary periodically from $\zeta_{low}$ to $\zeta_{high}$ according to a specific waveform. Although a sawtooth waveform is shown in FIG. 3, other waveforms (e.g., triangular, sinusoidal, square, . . . ) can be contemplated. In other implementations, the stimulus $\zeta(t)$ can vary aperiodically from $\zeta_{low}$ to $\zeta_{high}$.

Figure 4:
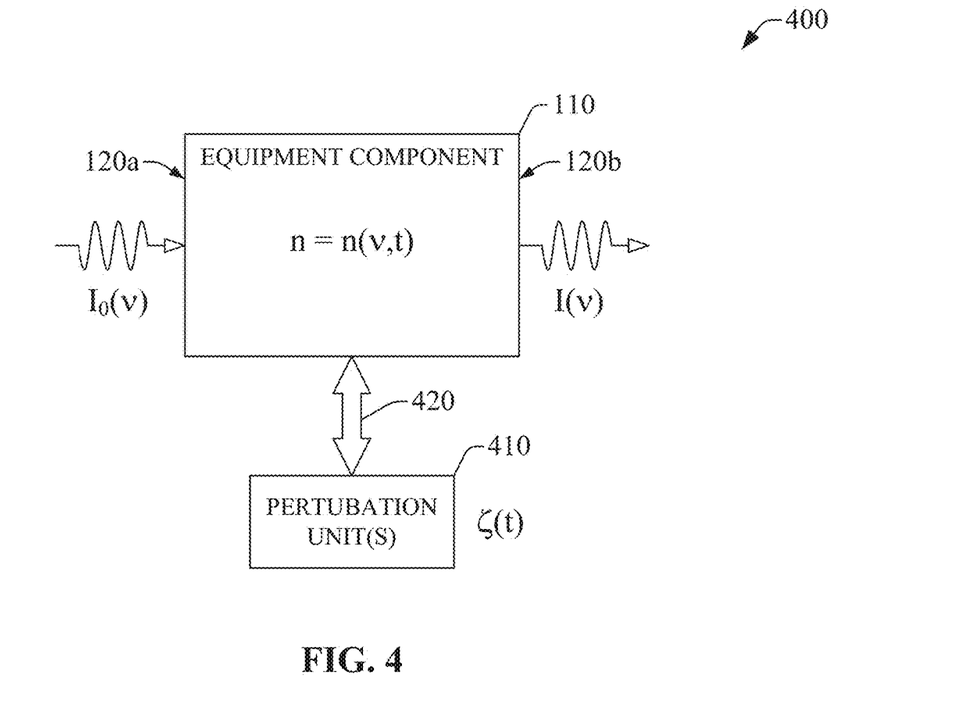
FIGS. 4-5 depict example apparatuses for management of optical noise in optical spectroscopy in accordance with at least certain aspects of the disclosure.

In certain embodiments, as illustrated in FIG. 4, for example, one or more perturbation units 410 (which may be referred to as perturbation unit(s) 410) can provide, at least in part, the stimulus $\zeta(t)$ 130. To at least such an end, at least one of the perturbation unit(s) 410 can be communicatively, fixedly, removably, mechanically, electrically, electromechanically, and/or thermally coupled to the equipment component 110 via one or more coupling members 420. Based at least on the type of stimulus that is applied, a coupling member can be embodied in or can include a pipe, a flange, an inlet, a thermally conductive element, an electrically conductive element, a combination thereof, or the like. In certain embodiments, the perturbation unit(s) 410 can include at least one unit that can provide the stimulus—e.g., a pneumatic valve, a piston, a bellow, a heating element, a thermoelectric component, and/or a component to apply a mechanical strain/stress—and at least one unit that can control the application of the stimulus. Such a unit can be embodied in or can include an electronic controller having a processor that can execute instructions (e.g., computer-accessible instructions) retained in a memory device in order to cause the application of at least part of the stimulus via the at least one unit that can provide the stimulus. In addition, in certain embodiments, the at least one unit that can control the application of the stimulus can include a mechanism (e.g., an electronic or mechanic timer) that can regulate electronically and/or mechanically the operation of the at least one unit that can provide the stimulus (e.g., implementation of an open-shut cycle of a valve). Further, in other embodiments, the at least one unit that can control the at least one unit that can provide the stimulus can include an external pneumatic controller or an electronic controller (which can be embodied in or can include a processing unit or a processor). Accordingly, in one aspect, such embodiments may be referred to as active control embodiments.

In addition or in the alternative, the perturbation unit(s) 410 can include at least one unit that can provide the stimulus, and can passively control the application thereof.

In certain embodiments, mechanism(s) and/or controller(s) can be integrated into or otherwise combined or included with the at least one unit that can provide the stimulus (e.g., a passive pneumatic system). Thus, in one aspect, such embodiments may be referred to as passive control embodiments. It should be appreciated that passive control embodiments can provide simplicity, reliability, and/or can permit cost management of the application of the stimulus in accordance with aspects of the disclosure.

In certain scenarios, the stimulus $\zeta(t)$ can be applied by heating or cooling a material that embodies or that is contained in the equipment component 110, or by applying a mechanical stress or strain to such material. For instance, in an embodiment in which the equipment component 110 is embodied in an optical member (e.g., a lens, a window, etc.), optical noise originating from interference between light propagation between two surfaces of the optical member can be mitigated by (a) heating or cooling the optical member, and/or (b) applying a mechanical stress or strain to the optical member in order to modify the optical member's refractive index.

In scenarios in which the stimulus $\zeta(t)$ is pressure, at least one of the perturbation unit(s) 410 and at least one of the coupling members 420 can permit modifying the pressure applied to the equipment component 110 as a function of time. Put more simply, $\zeta(t)=P(t)$, where P(t) is a function of time indicative or otherwise representative of the pressure applied to the equipment component 110. In one of such scenarios, the equipment component 110 can contain a gas, such as a noble gas or a substantially inert gas. For instance, the equipment component 110 can be embodied in a compartment of an optical spectroscopy analyzer. Without intending to be bound or otherwise limited by theory and/or modeling, the refractive index $n_g$ of a gas may be approximated as $n_g-1=C\cdot N$, where C is a gas-specific parameter that depends on wavelength, and N is a concentration of gas molecules that depends on temperature (T) and pressure (P). In addition, the index of refraction $n_{TP}$ of air at a specific temperature and pressure P may be expressed as $$n_{TP} - 1 = (n_s - 1)P\left[\frac{1 + P(60.100 - 0.972T)10^{-10}}{96095.430(1 + 0.00366T)}\right],$$

where T and P are measured, respectively, in degrees Celsius (° C.) and pascals (Pa), and $n_s$ is the index of refraction of dry air at 15° C. and 101325 Pa, and containing 0.045% by volume of carbon dioxide. As it can be readily gleaned from the foregoing equation, at constant temperature T, the refractive index shift $\Delta n=n_{TP}-n_s$ is nearly directly proportional to the pressure P. It should be appreciated that, in one aspect, the refractive index $n_s$ can exhibit dispersion (e.g., it can vary with wavelength). For example, without intending to be bound or otherwise limited by theory or modeling, the dispersion of the refractive index $n_s$ can be represented by the following relationship:

$$(n_s - 1)10^8 = 8342.54 + \frac{2406147}{130 - \sigma^2} + \frac{15998}{38.9 - \sigma^2}$$

where $\sigma=\lambda_0^{-1}$, with $\lambda_0$ being the wavelength of electromagnetic radiation in vacuum expressed in microns (μm).

For the refractive index shift $\Delta n$ and light wavelength $\lambda$, the minimum distance $d_{min}$ for which constructive interference can be changed to destructive interference can be determined via the following condition:

$$d_{min} = \frac{\lambda}{4\Delta n}.$$

As described herein, in certain aspects, transitions between constructive interference and destructive interference can permit management of optical noise in optical spectroscopy. As an illustration, for light having a wavelength λ=760 nm and a refractive index shift Δn≈0.0003, which can be achieved by a change in gas pressure of about 101325 Pa (e.g., about 1 atm), the value of $d_{min}$ can be determined as follows:

$$d_{min} = \frac{760 \; 10^{-9} \; m}{4 \times 3 \; 10^{-4}} = \frac{7.6 \; 10^{-7} \; m}{12 \; 10^{-4}} = \frac{7.6}{12} 10^{-3} \; m = 0.63 \; mm.$$

Similarly, a refractive index shift Δn caused by a change in gas pressure of about 26.6 kPa (e.g., about 200 Torr), can yield a $d_{min}$ of about 2.4 mm.

Without intending to be bound or otherwise limited by theory and/or modeling, the minimum change in pressure ($\Delta P_{min}$) to avoid optical interference fringes due to constructive interference can be determined via the following relationship:

$$\Delta P_{min} = P_{high} - P_{low} = \frac{\lambda}{4d_{min}\frac{\partial n_{TP}}{\partial P}},$$

where ∂n/∂P is the partial derivative of $n_{TP}$ with respect to pressure and is evaluated at $P_{low}$ and a constant temperature at which the change in pressure from $P_{low}$ to $P_{high}$ is effected. In an example scenario in which a linear dependence on pressure is adopted for $n_{TP}$, $$\frac{\partial n}{\partial P} = \frac{n_{TP} - 1}{P},$$

and $\Delta P_{min}$ can be determined as $$P_{high} - P_{low} = \frac{\lambda}{4d_{min}\left(\frac{n_{TP}(P_{min}, T) - 1}{P_{min}}\right)}.$$

Based at least on the illustrative analysis described herein, it can be readily apparent that in at least certain scenarios, ranges for the magnitude of the stimulus can be determined a priori, which can permit design of suitable stimuli in order to manage optical noise in optical spectroscopy.

In addition, it should be appreciated that the manner in which pressure is applied can be based at least in part on the equipment component 110. For example, in an embodiment in which the equipment component 110 is embodied in a compartment or enclosure of the optical spectroscopy equipment, pressure can be applied to the fluid (e.g., a gas, liquid or combination thereof) that can be contained in such compartment or enclosure. To at least such an end, in one implementation, the at least one of the perturbation unit(s) 410 can permit (A) injection of fluid into the compartment or enclosure in order to increase the pressure of the fluid therein from a first pressure (e.g., $P_{low}$) to a second pressure (e.g., $P_{high}$) over a predetermined time interval, and (B) release of fluid from the compartment or enclosure in order to decrease the pressure from the second pressure (e.g., $P_{high}$) to the first pressure (e.g., $P_{low}$) over another predetermined interval. The injection-release cycle can be repeated in order to produce a periodic modification of the pressure within the equipment component 110. It should be appreciated that other function P(t) can be implemented in other embodiments of this disclosure, where P represents the magnitude of pressure and t represents time, and where such a function can provide a periodic or aperiodic variation of pressure of the medium contained in or that forms the equipment component 110.

As an illustration, FIG. 5 presents a block diagram of an example embodiment 500 of the equipment component 110, the coupling member(s) 420, and the perturbation unit(s) 410 in accordance with at least certain aspects of the disclosure. For the sake of simplicity, the functional elements in the illustrated block diagram are shown in a cross-section representation. As illustrated, the equipment component 510 is embodied in an enclosure having a compartment 520 of the optical spectroscopy equipment, and an inlet conduit 560 providing a fluidic pathway between the compartment 520 and the exterior of the equipment component 510. The compartment 520 can include additional equipment components, such as a light source 530, an optical member 540 (e.g., a collimating lens), and a second optical member 550 (e.g., a window formed of a transparent or semi-transparent material, such as fused silica or other glass). The light source 530 can be embodied in or can comprise gas-discharge lamp or a tunable laser (such as a diode laser, a $CO_2$ laser, a dye laser, or a transition-metal solid-state laser) that can provide light (visible or otherwise) having wavelengths in a predetermined portion of the electromagnetic spectrum. The inlet conduit 560 permits injection of gas (e.g., instrument gas, nitrogen, or a noble gas) into the compartment 520. A gas source (not depicted in FIG. 5) can supply a substantially constant flow of the gas, which may be referred to as purge gas.

In addition, with reference to the example embodiment 400 of FIG. 4, the coupling member(s) 420 can be embodied in an outlet conduit 570 providing a fluidic pathway out of the compartment 520, which is coupled directly and/or fluidically to a valve 580 embodying the perturbation unit(s) 410. The valve 580 may be referred to as "modulating valve," and, in one aspect, can be embodied in a pneumatic valve configured to receive pressurized or otherwise compressed gas from the compartment 520 via the outlet conduit 570. In one aspect, the valve 580 can be configured to open at about a first pressure (e.g., $P_{high}$) and shut at about a second pressure (e.g., $P_{low}$) that is lower than the first pressure, thereby producing a substantially periodic variation of the pressure of the gas contained in the compartment 520. (See, e.g., FIG. 3). It should be appreciated that, in certain embodiments, the modulating valve 580 can be configured to produce substantially any periodic variation of pressure (e.g., a square waveform, a triangular waveform, a sinusoidal waveform, or the like) or time-dependent pressure profile (periodic or aperiodic). In certain embodiments, a mechanism (e.g., an electronic or mechanical timer) can regulate electronically and/or mechanically the operation of the valve 580 (e.g., implementation of an open-shut cycle), which can produce a predetermined or otherwise intended pressure profile in the compartment 520. In other embodiments, an external pneumatic or electronic controller (which can be embodied in or can include a computer or processing unit) can regulate the operation of the modulating valve 580. In the example embodiment 400 and 500, the time-dependent variation of pressure of the gas contained in the compartment 520 can yield a time-dependent variation of the refractive index of such gas, with the ensuing mitigation of optical noise on the intensity of light emanating from the optical member 550. As described herein, in one aspect, the optical noise can include optical interference fringes of constructive interference between light that propagates between a pair of surfaces through difference optical paths. Such fringes also may be referred to as "etalons," and can include etalons originating from light propagation between the light source 530 and the optical element 540 (referred to as "lens-light-source" etalons); the optical element 540 and the optical element 550 (referred to as "window-lens" etalons); and the light source 530 and the optical element 550 (referred to as "window-light-source" etalons). For a modulating valve 580 that can provide a sufficiently large range of variation between the a first pressure (e.g., $P_{high}$) and a lower second pressure (e.g., $P_{low}$), substantially all free-space etalons in the compartment 410 can be averaged out or otherwise removed over time during measurement of the intensity of light propagating through the optical member 550.

Figure 6:
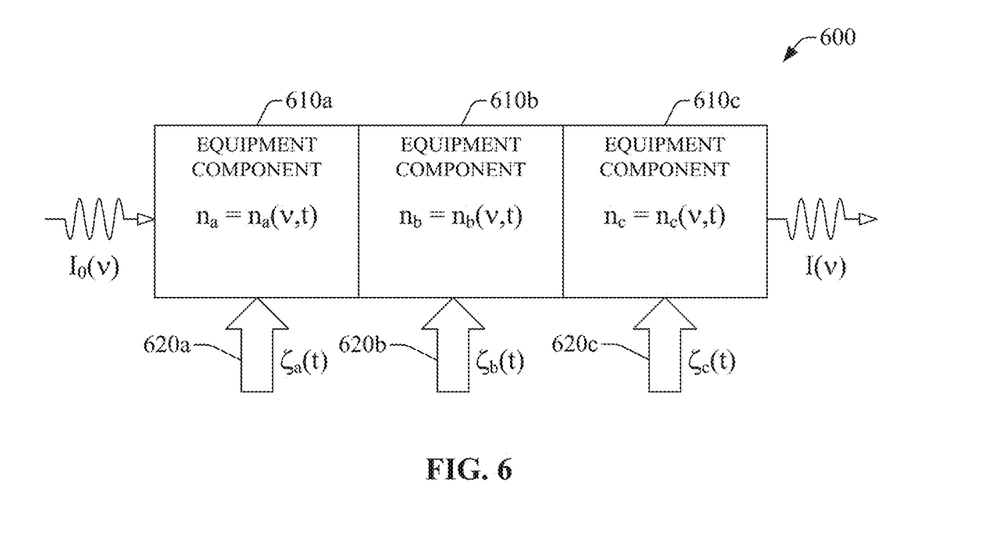
FIG. 6 presents an example of another apparatus for management of optical noise in optical spectroscopy in accordance with at least certain aspects of the disclosure.

In addition, the disclosure can permit mitigation of optical noise due to optical interference via time-dependent modification of the refractive index of substantially any component of an optical spectroscopy analyzer, including the light-source compartment, a detector compartment, a sample cell or chamber, or a combination thereof. To at least such an end, in one aspect, a group of equipment components can be subject to respective stimuli at least in order to effect a time-dependent variation of the respective refractive index of such components. As an illustration, FIG. 6 presents three equipment components 610a-610c that can be submitted to respective stimuli 620a-620c in order to modify the respective refractive indices as a function of time, thereby producing refractive indices $n_a(v, t)$, $n_b(v, t)$, and $n_c(v, t)$, with the ensuing mitigation of optical noise in accordance with aspects described herein.

Figure 7:
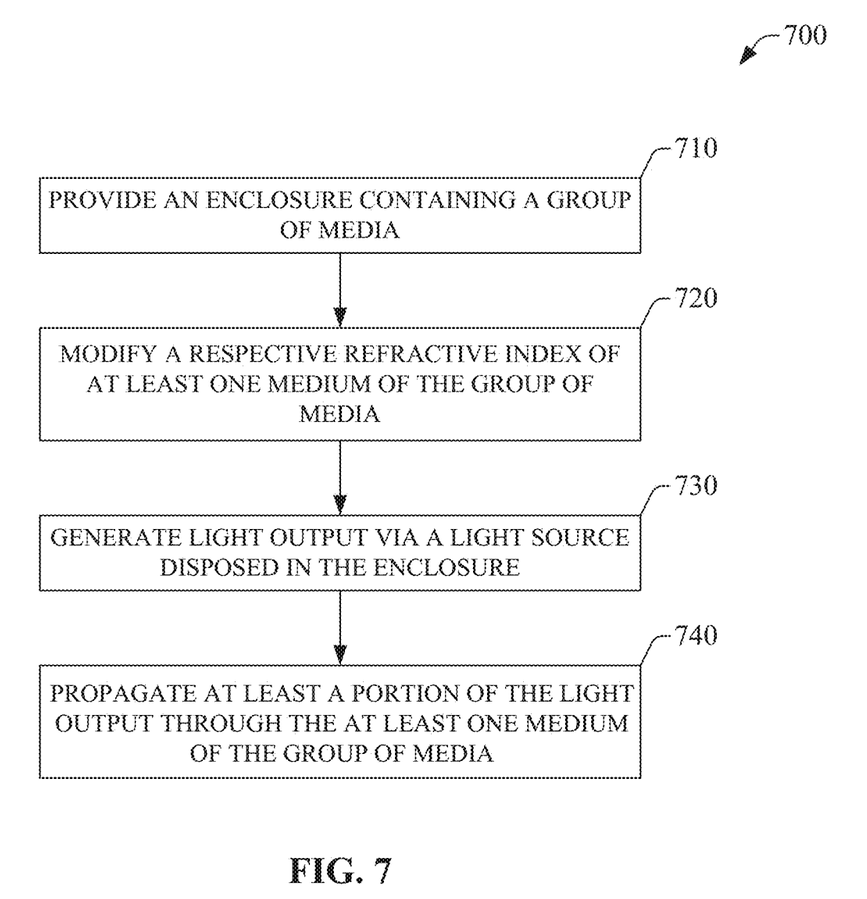
FIG. 7 presents an example of a technique for management of optical noise in optical spectroscopy in accordance with at least certain aspects of the disclosure.

In view of the aspects described herein, examples of a technique for management of optical noise in optical spectroscopy in accordance with at least certain aspects of the disclosure can be better appreciated with reference to the diagram in FIG. 7. For purposes of simplicity of explanation, the examples of the techniques disclosed herein are presented and described as a series of blocks, with each block representing an action or an operation in a method, for example. However, it is to be understood and appreciated that the disclosed techniques (e.g., process(es), procedure(s), method(s), and the like) are not limited by the order of blocks and associated actions or operations, as some blocks may occur in different orders and/or concurrently with other blocks from that are shown and described herein. For example, the various techniques of the disclosure can be alternatively represented as a series of interrelated states or events, such as in a state diagram. Furthermore, not all illustrated blocks, and associated action(s) or operation(s), may be required to implement a technique in accordance with one or more aspects of the disclosure. Further yet, two or more of the disclosed techniques can be implemented in combination with each other, to accomplish one or more features and/or advantages described herein.

It should be appreciated that, in certain embodiments, at least a portion of the techniques of the disclosure can be retained on an article of manufacture, or computer-readable storage medium in order to permit or facilitate transporting and transferring such techniques to a computing device (such as a microcontroller, a programmable logic controller, a programmable logic relay, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute instructions retained in a memory, or any computer- or machine-readable storage medium, to implement the techniques described herein. The instructions can embody or can constitute at least a portion of the techniques, and thus can provide a computer-executable or machine-executable framework to implement the techniques described herein.

FIG. 7 presents a flowchart of an example of a method 700 for managing optical noise in optical spectroscopy in accordance with at least certain aspects of the disclosure. At block 710, an enclosure containing a group of media can be provided. As described herein, in one aspect, providing such an enclosure can include providing a compartment of an optical spectroscopy analyzer, where the compartment can contain the at least one medium of the group of media. The group of media can include one or more solid, one or more fluids, some combination thereof, or the like. More particularly, yet not exclusively, in certain implementations, the enclosure and/or a compartment thereof can be substantially hermetically sealed, and the group of media can include at least one transparent medium (e.g., a transparent solid, a transparent fluid, a combination thereof, or the like) and/or at least one semi-transparent medium (e.g., a semi-transparent solid, a semi-transparent fluid, a combination thereof, or the like).

At block 720, the respective refractive index of at least one medium of the group of media can be modified. As described herein, in certain embodiments, such a refractive index can be modified in multiple different ways based in part on the at least one medium. For example, in an embodiment in which the at least one medium includes a fluid, the respective refractive index of the gas can be modified by modifying the pressure of the fluid as a function of time. For another example, in an embodiment in which the at least one medium includes a solid, the refractive index of the solid can be modified by applying a mechanical stress or strain to the solid as a function of time, and/or by heating or cooling the solid as a function of time. More generally, as described herein, the respective refractive index of the at least one medium of the group of media can be modified by modulating (e.g., modifying over a time) a stimulus that may be exerted on the at least one medium. Modulating the time-dependent stimulus applied to the at least one media can be achieved in many different ways, including modifying a pressure of the at least one of the one or more media; applying a mechanical strain to the at least one medium; applying a mechanical stress to the at least one medium; and/or modifying a temperature of the at least one medium. In one aspect, modifying the pressure of the at least one medium of the group of media can include periodically switching a pressure of a fluid from a first pressure to a second pressure.

At block 730, light output can be generated via a light source (e.g., a gas-discharge lamp, a tunable laser, or the like) disposed or otherwise contained in the enclosure. As described herein, the light output can be utilized or otherwise leveraged to conduct optical spectroscopy (such as optical absorption spectroscopy, optical emission spectroscopy, or the like). In addition, modification of the respective refractive index of the at least one medium of the group of media can permit mitigation of optical noise according to aspects of this disclosure. At block 740, at least a portion of the light output can be propagated through the at least one medium of the group of media.

Embodiments of the disclosure may be entirely or partially embodied in hardware, software, or a combination of the two (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and techniques (procedures, methods, processes, and the like) are described herein with reference to block diagrams and flowchart illustrations of methods, systems, apparatuses, and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in flowchart block(s) can be implemented in response to execution at the computer or processing apparatus.

Unless otherwise expressly stated, it is in no way intended that any technique, protocol, procedure, process, or method set forth herein be construed as requiring that its acts, operations, or steps be performed in a specific order. Accordingly, where a process or method claim does not actually recite an order to be followed by its acts, operations, or steps, or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used herein, the terms "component," "environment," "system," "platform," "architecture," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For instance, both a software application executing on a computing device and the computing device can be a component. One or more components may reside within a process and/or thread of execution. A component may be localized on one computing device or distributed between two or more computing devices. A component can execute from various computer-readable non-transitory media having various data structures stored thereon. As another example, a component can be an apparatus that provides specific functionality through electronic components without mechanical parts, the electronic components can include a processor therein to execute software or firmware that confers at least in part the functionality of the electronic components. As yet another example, a component can be an apparatus that provides specific functionality by means of mechanical parts without reliance on electronic or electromechanical parts. As a further another example, a component can be an apparatus with specific functionality provided by mechanical parts, electrical parts, and/or electromechanical parts operated by electric or electronic circuitry that can be controlled by a software application or firmware application executed by a processor, wherein the processor can be internal or external to the apparatus and can execute at least a part of the software or firmware application. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processor, application, and/or other programming components. The terms "component," "environment," "system," "platform," "architecture," "interface," "unit," and "module" can be utilized interchangeably and can be referred to collectively as functional elements.

In the present specification and annexed drawings, reference to a "processor" is made. As utilized herein, a processor can refer to, for example, any computer processing unit or device having single-core processors; single-processors with software multithread execution capability; multi-core processors; multi-core processors with software multithread execution capability; multi-core processors with hardware multithread technology; parallel platforms; and parallel platforms with distributed, shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. As an example, a processor can be implemented as a combination of computer processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROMs, digital versatile disks (DVD) or other optical storage, magnetic cassettes, magnetic tapes, magnetic disk storage or other magnetic storage devices, flash memory cards or other types of memory cards, cartridges, or any other non-transitory medium suitable to retain the desired electronic information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of systems, apparatuses, devices, techniques, and computer-program products that can provide management of optical noise in optical spectroscopy. It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A system for suppressing optical noise within equipment utilized for optical spectroscopy, comprising:
a compartment of an optical spectroscopy analyzer, the compartment containing a light source, one or more optical members and one or more media, the one or more media including one or more transparent or semi-transparent materials, the compartment substantially hermetically sealing the one or more media, and the compartment having different optical paths of light propagating through the one or more optical members and one or more media;
an inlet conduit disposed on the compartment for providing a first fluidic pathway for the one or more media into the compartment between the compartment and an exterior of an equipment component embodied in an enclosure having the compartment;
an outlet conduit disposed on the compartment for providing a second fluidic pathway for the one or more media out of the compartment between the compartment and the exterior of the equipment component embodied in the enclosure having the compartment;
means including a timer and a modulating valve mechanically coupled to the outlet conduit to communicate with the compartment, the timer configured to regulate electronically and/or mechanically the operation of an open-shut cycle of the valve, the modulating valve configured to receive pressurized or compressed gas from the compartment via the outlet conduit, and the modulating valve configured for periodically modifying a stimulus to periodically vary between higher and lower magnitudes of the stimulus to generate a periodically modified stimulus;
means including the modulating valve for applying the periodically modified stimulus to the one or more media to periodically modify a respective refractive index as a function of time of the one or more media to allow at least a portion of a light output to propagate in different optical paths through one or more optical members and the one or more media applied with the periodically modified stimulus; and
means for producing light output, wherein at least a portion of the light output propagates in the different optical paths through the one or more optical members and the one or more media, for measuring an intensity of the light output over an interval greater than a period for the stimulus to vary from the higher magnitude to the lower magnitude.

2. The system of claim 1, wherein the stimulus is a pressure, and wherein the means for periodically modifying the stimulus comprises means for periodically switching a pressure applied to the one or more media between a first pressure and a second pressure different from the first pressure.

3. The system of claim 1, wherein the stimulus is a mechanical stress, and wherein the means for periodically modifying the stimulus comprises means for periodically switching a mechanical stress applied to the one or more media.

4. The system of claim 1, wherein the stimulus is a temperature, and wherein the means for periodically modifying the stimulus comprises means for heating or cooling the one or more media.

\* \* \* \* \*